United States Patent
Kawamura (10) Patent No.: US 10,236,704 B2
(45) Date of Patent: Mar. 19, 2019

(54) CHARGE COLLECTION DEVICE AND POWER COLLECTION METHOD

(71) Applicant: Yazaki Corporation, Minato-ku, Tokyo (JP)

(72) Inventor: Yoshihiro Kawamura, Makinohara (JP)

(73) Assignee: Yazaki Corporation, Minato-ku, Tokyo (JP)

(*) Notice: Subject to any disclaimer, the term of this patent is extended or adjusted under 35 U.S.C. 154(b) by 2 days.

(21) Appl. No.: 15/493,296

(22) Filed: Apr. 21, 2017

(65) Prior Publication Data

US 2017/0317514 A1    Nov. 2, 2017

(30) Foreign Application Priority Data

Apr. 28, 2016    (JP) .................................. 2016-091027

(51) Int. Cl.
*H02J 7/00*    (2006.01)
*H02J 7/34*    (2006.01)

(52) U.S. Cl.
CPC .......... *H02J 7/0068* (2013.01); *H02J 7/0034* (2013.01); *H02J 7/345* (2013.01)

(58) Field of Classification Search
CPC .................................................... H02J 7/0068
USPC ......................................................... 320/166
See application file for complete search history.

(56) References Cited

U.S. PATENT DOCUMENTS

| | | |
|---|---|---|
| 9,199,539 B2 | 12/2015 | Iwanabe et al. |
| 9,423,446 B2 | 8/2016 | Kawamura et al. |
| 2014/0214262 A1 | 7/2014 | Iwanabe et al. |
| 2014/0266003 A1 | 9/2014 | Biskup |
| 2014/0333321 A1 | 11/2014 | Kawamura et al. |
| 2015/0022219 A1* | 1/2015 | Kawamura ......... G01R 31/024 324/551 |

FOREIGN PATENT DOCUMENTS

| | | |
|---|---|---|
| EP | 2506390 A1 | 10/2012 |
| JP | S59-003380 U | 1/1984 |
| JP | 2004-170103 A | 6/2004 |
| JP | 2012-210109 A | 10/2012 |
| JP | 2013-205082 A | 10/2013 |
| JP | 2014-126382 A | 7/2014 |
| JP | 2014-149193 A | 8/2014 |

OTHER PUBLICATIONS

May 29, 2018—(JP) Notification of Reasons for Refusal—App 2016-091027, Eng Tran.

* cited by examiner

*Primary Examiner* — Edward Tso
*Assistant Examiner* — Ahmed H Omar
(74) *Attorney, Agent, or Firm* — Banner & Witcoff, Ltd.

(57) ABSTRACT

A charge collection device includes a capacitor, a first switch disposed between one terminal of the capacitor and a positive electrode of a DC power source, a second switch disposed between the other terminal of the capacitor and a negative electrode of the DC power source, a third switch disposed between the one terminal of the capacitor and a ground, a fourth switch disposed between the other terminal of the capacitor and the ground, and a charge collection circuit that has a fifth switch connected to the one terminal of the capacitor and configured to supply charge stored in the capacitor to an external circuit via the fifth switch.

6 Claims, 6 Drawing Sheets

| OPERATION MODE | | | STATES OF RESPECTIVE SWITCHES | | | | |
|---|---|---|---|---|---|---|---|
| | | | S1 | S2 | S3 | S4 | S5 |
| M01 | CHARGING OF CAPACITOR C1 | VO | CLOSED | CLOSED | OPEN | OPEN | OPEN |
| | | Vc1n | CLOSED | OPEN | OPEN | CLOSED | OPEN |
| | | Vc1p | OPEN | CLOSED | CLOSED | OPEN | OPEN |
| M02 | MEASUREMENT OF VOLTAGE BETWEEN TERMINALS | | OPEN | OPEN | CLOSED | CLOSED | OPEN |
| M03 | COLLECTION OF STORED CHARGE | | OPEN | OPEN | OPEN | CLOSED | CLOSED |
| M04 | DISCHARGE OF CAPACITOR C1 | | OPEN | OPEN | CLOSED | CLOSED | OPEN |

CHARGE COLLECTION DEVICE AND POWER COLLECTION METHOD

CROSS REFERENCE TO RELATED APPLICATIONS

This application is based on Japanese Patent Application (No. 2016-091027) filed on Apr. 28, 2016, the contents of which are incorporated herein by reference.

BACKGROUND OF THE INVENTION

1. Field of the Invention

The present invention relates to a charge collection device and a power collection method and, for example, to a technique that can be used for collecting, from a vehicular measuring device, electric energy that would otherwise be consumed uselessly.

2. Description of the Related Art

For example, JP-A-2013-205082, JP-A-2014-126382, and JP-A-2014-149193 disclose insulation state detecting devices that measure voltages as a capacitor called a flying capacitor experiences repeated cycles of charging and discharge and detect ground fault resistances on the basis of the measured voltages.

In such insulation state detecting devices, a voltage is measured after charging of the flying capacitor and then the flying capacitor is discharged. This discharge of the flying capacitor is indispensable for a correct measurement in the next cycle.

However, the operation of simply discharging the flying capacitor after a voltage measurement means wasteful discard of electric energy. In addition, in, for example, vehicles, the same measurement operation needs to be performed repeatedly on a regular basis, for example, for monitoring as to whether electric insulation is maintained safely, as a result of which useless consumption of electric energy is repeated.

To suppress useless consumption of electric energy due to discharge of the flying capacitor, it is conceivable to, for example, reduce the capacitance of the flying capacitor or elongate the measurement period to lower the measurement frequency.

However, it is highly probable that reduction of the capacitance of the flying capacitor results in reduction of measurement accuracy. On the other hand, elongation of the measurement period causes a problem that a delay time from occurrence of a certain abnormality to enablement of its detection increases.

SUMMARY OF THE INVENTION

The present invention has been made in view of the above circumstances, and an object of the invention is therefore to provide a charge collection device and a power collection method that can be used for suppressing useless consumption of electric energy due to discharge of a flying capacitor that is used for measurement.

To attain the above object, the invention provides a charge collection device and a power collection method that are set forth below as items (1) to (4):

(1) A charge collection device including:
a capacitor;
a first switch disposed between one terminal of the capacitor and a positive electrode of a DC power source;
a second switch disposed between the other terminal of the capacitor and a negative electrode of the DC power source;
a third switch disposed between the one terminal of the capacitor and a ground;
a fourth switch disposed between the other terminal of the capacitor and the ground; and
a charge collection circuit that has a fifth switch connected to the one terminal of the capacitor and configured to supply charge stored in the capacitor to an external circuit via the fifth switch.

(2) The charge collection device according to item (1), further including:
a measuring circuit disposed between the third switch and the ground and that measures a voltage between the one terminal and the other terminal of the capacitor.

(3) The charge collection device according to item (1) or (2), further including:
a diode that permits a current flow in a forward direction from the one terminal of the capacitor to the charge collection circuit and that prevents a current flow in an opposite direction opposite to the forward direction.

(4) A power collection method of a charge collection device, wherein the charge collection device includes:
a capacitor;
a first switch disposed between one terminal of the capacitor and a positive electrode of a DC power source;
a second switch disposed between the other terminal of the capacitor and a negative electrode of the DC power source;
a third switch disposed between the one terminal of the capacitor and a ground;
a fourth switch disposed between the other terminal of the capacitor and the ground;
a charge collection circuit that has a fifth switch connected to the one terminal of the capacitor and configured to supply charge stored in the capacitor to an external circuit via the fifth switch; and
a measuring circuit disposed between the third switch and the ground and that measures a voltage between the one terminal and the other terminal of the capacitor,
the power collection method comprising:
charging the capacitor by closing the first switch and the second switch and opening the third switch, the fourth switch, and the fifth switch;
measuring a voltage between the one terminal and the other terminal of the capacitor using the measuring circuit by opening the first switch and the second switch and then closing the third switch and the fourth switch; and
supplying charge of the capacitor to the external circuit by opening the third switch and then closing the fifth switch.

According to the charge collection device set forth in item (1), the charge collection circuit can supply the external circuit with at least part of charge to be consumed uselessly of the charge stored in the capacitor via the fifth switch. As a result, electric energy collected by the charge collection circuit can be reused, that is, used effectively.

According to the charge collection device set forth in item (2), a voltage between the one terminal and the other terminal of the capacitor can be measured using the measuring circuit. This makes it possible to measure a power source voltage, ground fault resistances, etc.

According to the charge collection device set forth in item (3), a phenomenon can be prevented that when the voltage between the one terminal and the other terminal of the capacitor becomes low, an opposite current flows and the charge stored in the capacitor is thereby moved to the charge collection circuit. This makes it possible to continue charge collection until the voltage between the terminals of the capacitor becomes very low and to thereby increase the amount of collectable charge.

According to the power collection method set forth in item (4), useless discharge from the capacitor can be stopped by opening the third switch after completion of a necessary voltage measurement. By closing the fifth switch in this state, the charge stored in the capacitor can be collected and supplied to the external circuit before discharge of the capacitor.

According to the charge collection device and the power collection method according to the invention, since the charge of the flying capacitor that is used for measurement can be collected before it is discharged, useless consumption of electric energy due to its discharge can be suppressed.

The invention has been described above concisely. The details of the invention will become more apparent when the modes for carrying out the invention (hereinafter referred to as an embodiment) described below are read through with reference to the accompanying drawings.

DETAILED DESCRIPTION OF THE EXEMPLARY EMBODIMENTS

A specific embodiment of the present invention will be hereinafter described with reference to the drawings.

Figure 1:
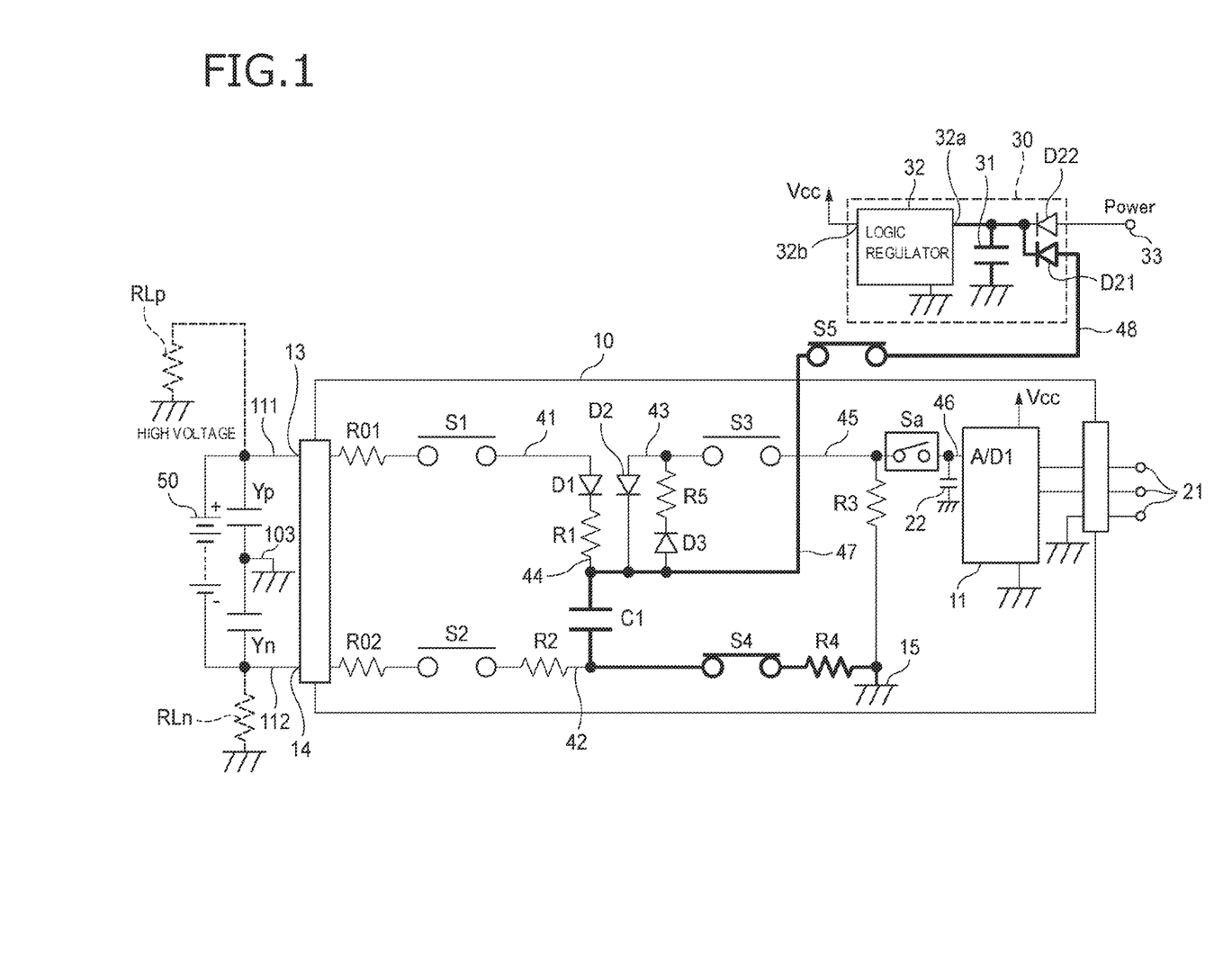
FIG. 1 is a circuit diagram showing main components of a system including a charge collection device according to an embodiment of the present invention.

First, an overall configuration and operation will be outlined. FIG. 1 shows main components of a system including a charge collection device according to the embodiment of the invention. The system shown in FIG. 1 consists of a ground fault measuring circuit 10 to be used for detecting ground fault resistances on, for example, a vehicle and peripheral circuits accompanying it. Although the embodiment is directed to the case that the invention is applied to a device for measuring ground fault resistances, the invention can also be applied to other kinds of devices such as voltage measuring devices that uses a flying capacitor.

The ground fault measuring circuit 10 shown in FIG. 1 can be used being installed in vehicles such as electric vehicles and hybrid vehicles which are equipped with an engine and an electric motor. A vehicular DC high-voltage power source 50 outputs high-voltage (e.g., about 200 V) DC power. An electric motor which generates thrust for a vehicle can be driven on power that is output from the vehicular DC high-voltage power source 50.

A positive-side (output) power line 111 for the vehicular DC high-voltage power source 50 and a ground electrode 103 are electrically insulated from each other. A negative-side power line 112 for the vehicular DC high-voltage power source 50 and a ground electrode 103 are also electrically insulated from each other. The ground electrode 103 corresponds to a ground portion of, for example, the vehicle body of a vehicle. The state of insulation between the positive-side power line 111 and the ground electrode 103 can be represented by a ground fault resistance RLp, and the state of insulation between the negative-side power line 112 and the ground electrode 103 can be represented by a ground fault resistance RLn.

To reduce common-mode noise, as shown in FIG. 1, a Y capacitor Yp is connected between the positive-side power line 111 and the ground electrode 103 and a Y capacitor Yn is connected between the negative-side power line 112 and the ground electrode 103.

By installing the ground fault measuring circuit 10 shown in FIG. 1 in a vehicle, the insulation state of the vehicle can be checked any time when it is necessary to do so. That is, the ground fault measuring circuit 10 can be used for recognizing an insulation state by detecting ground fault resistances RLp and RLn on the output side of the vehicular DC high-voltage power source 50.

To this end, as shown in FIG. 1, a positive-side input terminal 13 and a negative-side input terminal 14 of the ground fault measuring circuit 10 are connected to the positive-side power line 111 and the negative-side power line 112, respectively. A ground electrode 15 of the ground fault measuring circuit 10 is connected to the ground electrode 103.

As shown in FIG. 1, output terminals 21 are provided to output a measurement result of the ground fault measuring circuit 10 and alarm information. The output terminals 21 may be connected to a vehicle-side electronic control unit (ECU), for example.

In the system shown in FIG. 1, an EH (Energy Harvesting) power unit 30 (charge collection circuit) is provided to generate a logic DC power source voltage Vcc which is necessary for operation of the ground fault measuring circuit 10. The EH power unit 30 has a function of collecting and reusing part, not to be used by the ground fault measuring circuit 10, of charge once stored in a flying capacitor that is provided in the ground fault measuring circuit 10. The EH power unit 30 is connected to the ground fault measuring circuit 10 via a switching element S5. The EH power unit 30 will be described later in detail.

Next, an example configuration of the ground fault measuring circuit 10 will be described. As shown in FIG. 1, the ground fault measuring circuit 10 is equipped with a detection capacitor C1 which operates as a flying capacitor. In the embodiment, the detection capacitor C1 is, for example, a ceramic capacitor in view of the fact that the ground fault measuring circuit 10 is for vehicular use. However, naturally, the invention is not limited this case.

To control charging and discharge of the detection capacitor C1, four switching elements S1-S4 are provided around it. Furthermore, the switching element S5 is provided to collect unnecessary charge and a switching element Sa is provided to sample measurement voltages. Each of the switching elements S1-S4, S5, and Sa is a switch whose contact opening/closing state (on/off state) can be switched by an insulated control signal, such as an optical MOSFET.

This configuration is just an example, and it suffices that the invention be applied to a flying capacitor type circuit. Thus, the invention may be applied to, for example, a circuit not having the switching element Sa.

One end of the switching element S1 (first switch) is connected to the positive-side input terminal 13 via a resistor R01, and the other end of it is connected to a line 41. One end of the switching element S2 (second switch) is connected to the negative-side input terminal 14 via a resistor R02, and the other end of it is connected to a line 42 via a resistor R2.

One end of the switching element S3 (third switch) is connected to a line 43, and the other end of it is connected to a line 45. One end of the switching element S4 (fourth switch) is connected to the line 42, and the other end of it is connected to the ground electrode 15 via a resistor R4. One end of the switching element S5 (fifth switch) is connected to a line 47, and the other end of it is connected to the EH power unit 30.

The negative terminal of the detection capacitor C1 is connected to the line 42, and its positive terminal is connected to the line 41 via a series circuit of a diode D1 and a resistor R1. Furthermore, the positive terminal of the detection capacitor C1 is connected to the line 43 via a series circuit of a diode D3 and a resistor R5 as well as via a diode D2. Whereas the diode D2 is provided with such polarity as to allow a current flow from the line 43 to a line 44, the diode D3 is provided with such polarity as to allow a current flow from the line 44 to the line 43. The positive terminal of the detection capacitor C1 is also connected to the one end of the switching element S5 via the line 47.

To discharge the detection capacitor C1, the line 44 may be grounded via a special switch and a resistor (neither shown). However, such a special discharge circuit can be omitted by using resistors having relatively small resistances as the resistors R3, R4, and R5.

A microcomputer (CPU) 11 performs various controls that are necessary in the ground fault measuring circuit 10 by running preinstalled programs. More specifically, the microcomputer 11 controls charging and discharge of the detection capacitor C1 by controlling the switching elements S1-S4 individually. Furthermore, the microcomputer 11 recognizes ground fault resistances RLp and RLn by receiving analog levels corresponding to charging voltages of the detection capacitor C1 at an analog input port AD1 via a line 46 and performs a calculation on the basis of the received input level. Furthermore, in the embodiment, the microcomputer 11 controls the switching element S5 to collect unnecessary charge that is stored in the detection capacitor C1.

The switching element Sa is connected between the lines 45 and 46. The switching element Sa is closed only for a short time with certain measurement timing to enable sampling of a signal appearing on the line 45. That is, a measurement target voltage level is held by a capacitor 22 which is connected to the analog input port AD1 of the microcomputer 11.

Next, the configuration of the EH power unit 30 will be described. The EH power unit 30 shown in FIG. 1 is equipped with two diodes D21 and D22, a capacitor 31, and a regulator 32.

The anode terminal of the diode D21 is connected to the positive terminal of the detection capacitor C1 via the switching element S5 and the line 47. The cathode terminal of the guide D21 is connected to an input terminal 32a of the regulator 32 and one end of the capacitor 31. A power input terminal 33 to which the anode terminal of the diode D22 is connected is supplied with DC or AC power from a vehicle-side power circuit when necessary. The cathode terminal of the diode D22 is connected to the input terminal 32a of the regulator 32 and the one end of the capacitor 31.

The one end of the capacitor 31 is connected to the cathode terminals of the diodes D21 and D22 and the input terminal 32a of the regulator 32, and the other end of the capacitor 31 is grounded. The capacitor 31 accumulates charge that is supplied via the diode D21 or D22 so that resulting charge can be used in the form of power-source power. The regulator 32 has a voltage regulating function for generating a stable DC voltage on the basis of input power, and outputs, at an output terminal 32b, a prescribed logic DC power source voltage Vcc that is required by various logic circuits as power-source power. More specifically, the regulator 32 outputs, as the logic DC power source voltage Vcc, a DC voltage +5 V or +3.3 V.

In the system shown in FIG. 1, when unnecessary charge is stored in the detection capacitor C1 of the ground fault measuring circuit 10, the unnecessary charge stored in the detection capacitor C1 can be collected as environmental power by moving it to the input terminal of the EH power unit 30 via the switching element S5 by turning on the switching element S5.

The diode D21 allows a current flow only in the direction from the positive terminal of the detection capacitor C1 to the input terminal 32a of the regulator 32. Thus, when the voltage at the positive terminal of the detection capacitor C1 is higher than the voltage at the input terminal 32a, the charge of the detection capacitor C1 can be collected by the EH power unit 30 via the diode D21. When the voltage at the positive terminal of the detection capacitor C1 is lower than the voltage at the input terminal 32a, an opposite current flow is prevented by the diode S21, whereby discharge of the capacitor 31 can be prevented.

If the charge stored in the capacitor 31 is insufficient when no unnecessary charge is stored in the detection capacitor C1, power that is required by the EH power unit 30 can be secured by supplying DC or AC power from a vehicle-side power circuit to the power input terminal 33. Discharge of the capacitor 31 to the power input terminal 33 can be prevented because the diode D22 prevents a current flow in the opposite direction.

In the system shown in FIG. 1, the logic DC power source voltage Vcc which is output from the EH power unit 30 at its output terminal 32b is supplied to logic circuits such as the microcomputer 11 of the ground fault measuring circuit 10 as power-source power. Charge that has occurred in the detection capacitor C1 of the ground fault measuring circuit 10 and is not to be used can be reused by collecting it by the EH power unit 30 and returning it to the ground fault measuring circuit 10 as power-source power.

Figure 2:
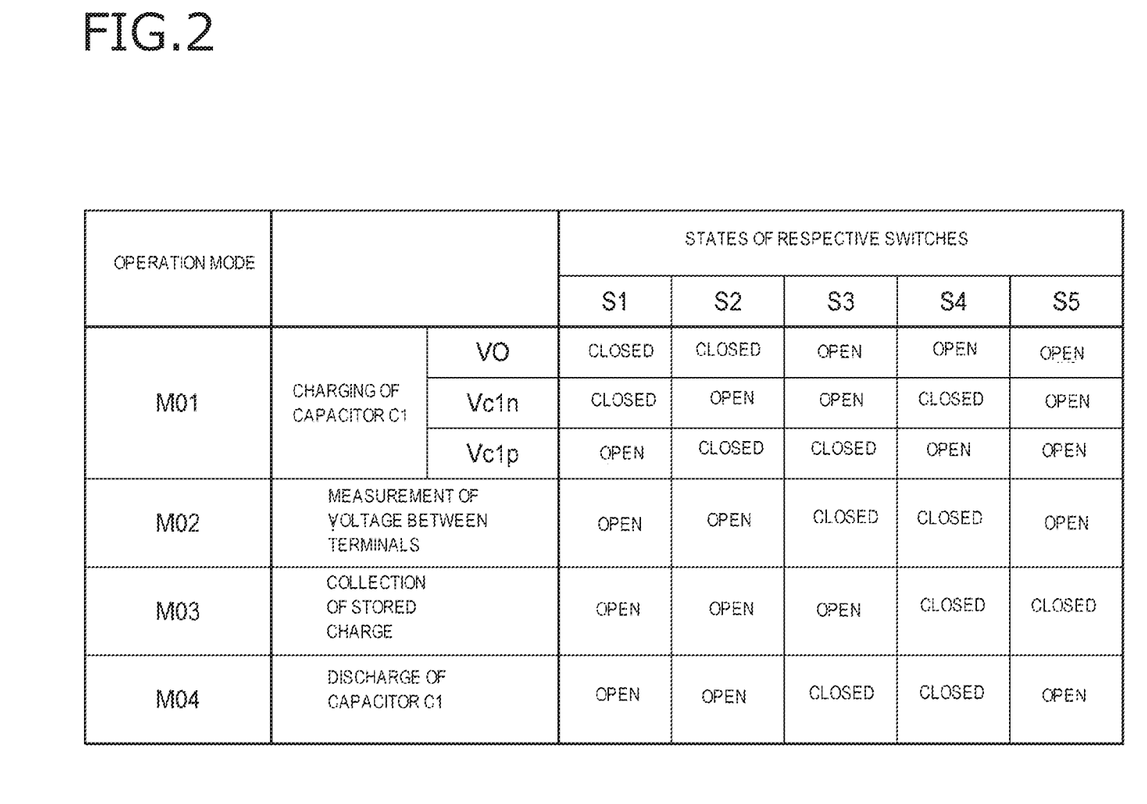
FIG. 2 is a list showing a corresponding relationship between operation modes of a ground fault measuring circuit shown in FIG. 1 and the states of respective switches employed in it.

Next, operation modes and sets of states of the respective switches will be described. FIG. 2 is a list showing a corresponding relationship between operation modes of the ground fault measuring circuit 10 shown in FIG. 1 and sets of states of the respective switches.

The ground fault measuring circuit 10 shown in FIG. 1 has four operation modes M01, M02, M03, and M04 shown in FIG. 2 as modes of operation involving the detection capacitor C1.

The operation mode M01 is a mode for charging the detection capacitor C1 which is a flying capacitor. The ground fault measuring circuit 10 has three measurement targets, that is, voltages V0, Vc1n, and Vc1p. In the operation mode M01, it is necessary to change the states of the switches according to the measurement target.

The operation mode M02 is a mode for measuring a voltage between the terminals of the detection capacitor C1 that has been charged. The operation mode M03 is a mode for collecting, that is, moving to the EH power unit 30, charge that is stored in the detection capacitor C1 after completion of a measurement and is not to be used. The operation mode M04 is a mode for discharging the detection capacitor C1 and thereby returning it to the initial state to prepare for the next measurement.

As shown in FIG. 2, in the case where the measurement target voltage is V0 in the operation mode M01, the states of the switching elements S1, S2, S3, S4, and S5 are controlled to "closed (on)," "closed," "open (off)," "open," and "open," respectively. Where the measurement target voltage is Vc1$n$ in the operation mode M01, the states of the switching elements S1-S5 are controlled to "closed," "open," "open," "closed," and "open," respectively. Where the measurement target voltage is Vc1$p$ in the operation mode M01, the states of the switching elements S1-S5 are controlled to "open," "closed," "closed," "open," and "open," respectively.

In the operation mode M02, the states of the switching elements S1-S5 are controlled to "open," "open," "closed," "closed," and "open," respectively. In the operation mode M03, the states of the switching elements S1-S5 are controlled to "open," "open," "open," "closed," and "closed," respectively. In the operation mode M04, the states of the switching elements S1-S5 are controlled to "open," "open," "closed," "closed," and "open," respectively.

Figure 3:
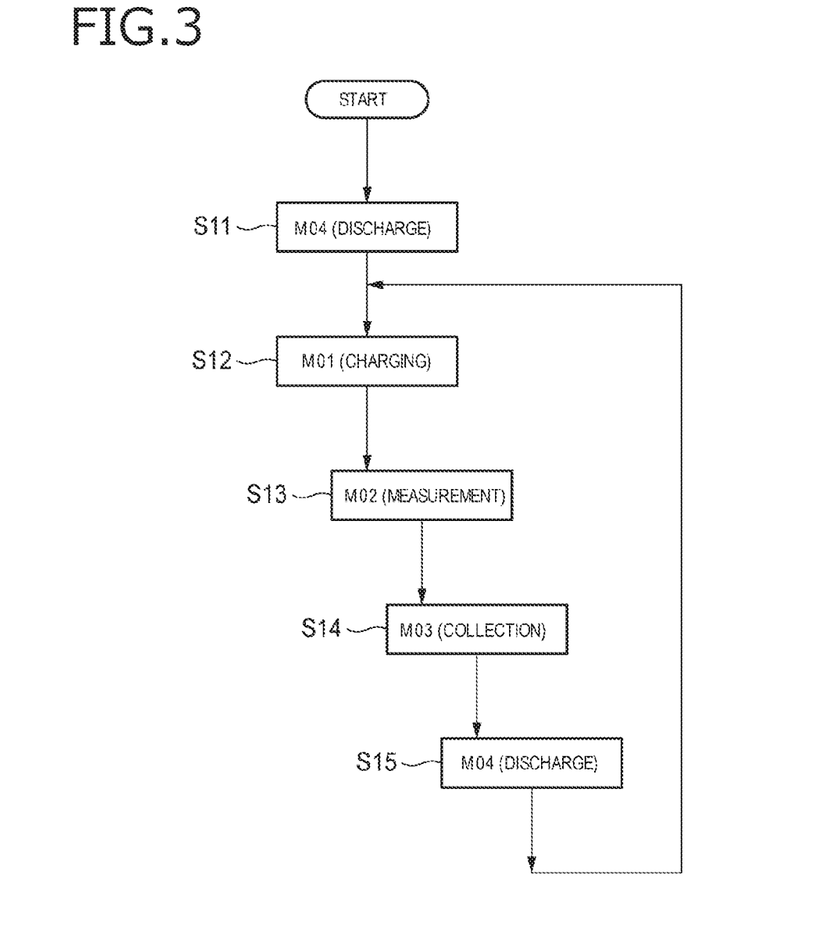
FIG. 3 is a sequence diagram showing how transitions occur between the operation modes in the ground fault measuring circuit shown in FIG. 1.

Next, transitions between the operation modes will be described. FIG. 3 shows how transitions occur between the operation modes in the ground fault measuring circuit 10 shown in FIG. 1. As shown in FIG. 3, in the ground fault measuring circuit 10, at a first step S11, a transition is made to the operation mode M04, in which the detection capacitor C1 is discharged. Then, at steps S12-S15, measurements are performed as transitions are made sequentially to the operation modes M01, M02, M03, M04, M01, M02, M03, . . . .

A characteristic feature of the operation shown in FIG. 3 is that after a measurement is performed at step S13, a transition is made at step S14 to the operation mode M03, energy not to be used in the ground fault measuring circuit 10 is collected in the operation mode M03, and then a transition is made to step M04. That is, once a measurement is completed at step S13, the charge stored in the detection capacitor C1 is no longer necessary. Whereas usually this charge is discarded by discharge, in the embodiment a discharge operation is performed after collecting as much energy as possible in the operation mode M03. As a result, even if the detection capacitor C1 has a relatively large capacitance, energy that is discarded wastefully can be reduced and energy that is not discarded can be reused in the EH power unit 30.

Figure 4:
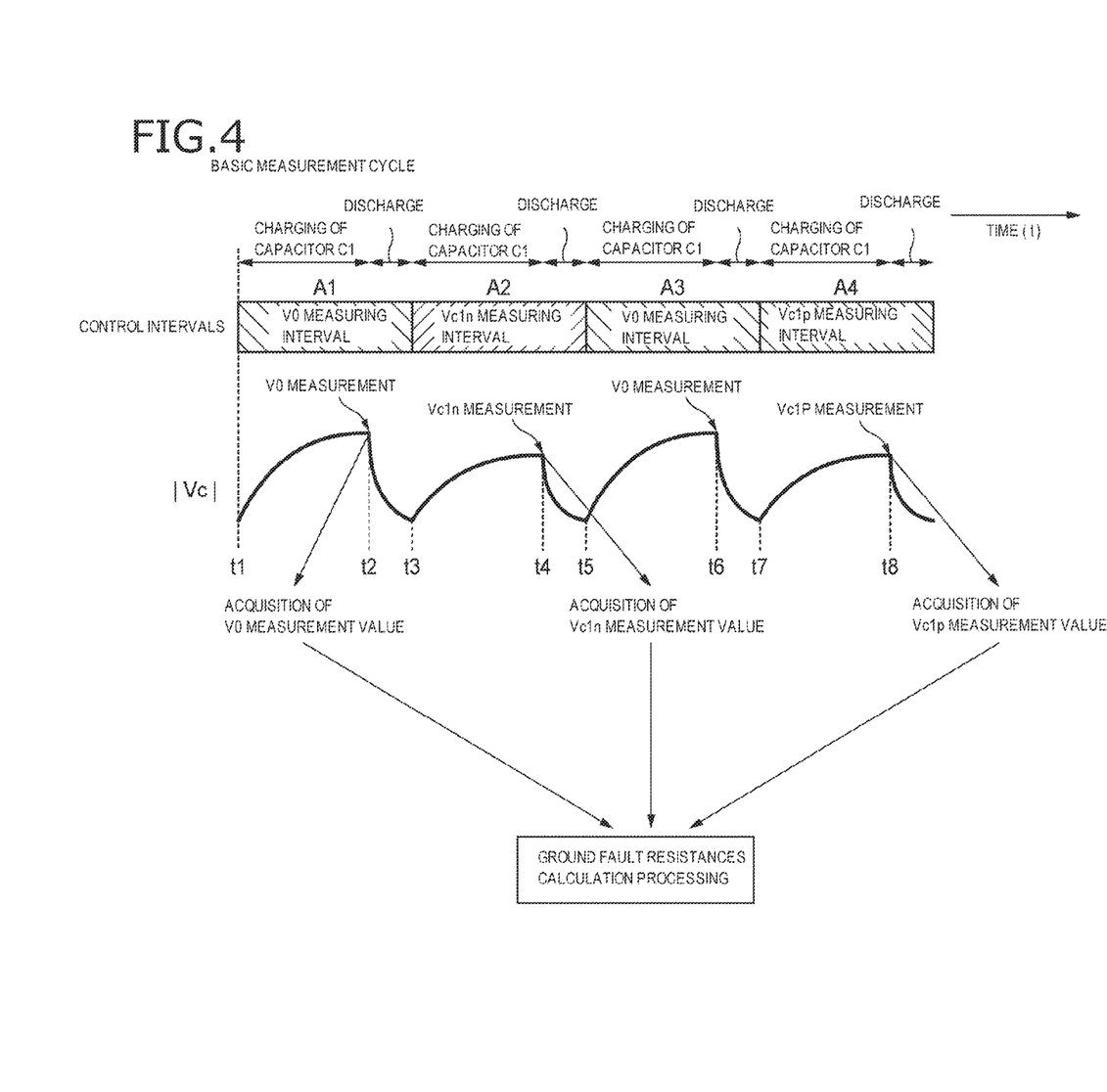
FIG. 4 is a time chart showing an example of how a basic measurement cycle of the ground fault measuring circuit shown in FIG. 1 proceeds.

Next, a measurement of ground fault resistances will be described starting from a basic measurement cycle. FIG. 4 shows an example of how a basic measurement cycle of the ground fault measuring circuit 10 shown in FIG. 1 proceeds. In FIG. 4, the above-described operation that is performed in the operation mode M03 (collection) is omitted.

As shown in FIG. 4, the basic measurement cycle of the ground fault measuring circuit 10 is a series of a V0 measuring interval A1, a VC1$n$ measuring interval A2, a V0 measuring interval A3, a VC1$p$ measuring interval A4. And this basic measurement cycle occurs repeatedly.

In the V0 measuring interval A1 and A3, a charging voltage V0 is measured which varies according to the power source voltage. The charging voltage V0 is irrelevant to the ground fault resistances. In the VC1$n$ measuring interval A2, a charging voltage VC1$n$ is measured which varies being influenced by the negative-side ground fault resistance RLn. In the VC1$p$ measuring interval A4, a charging voltage VC1$p$ is measured which varies being influenced by the positive-side ground fault resistance RLp.

In each of the intervals A1, A2, A3, and A4, a charging operation for charging the detection capacitor C1 (flying capacitor), a measurement operation for measuring a voltage between the terminals of the detection capacitor C1, and a discharge operation for discharging the detection capacitor C1 are performed.

As shown in FIG. 4, the voltage Vc between the terminals of the detection capacitor C1 increases according to an exponential curve that is determined by the time constant of the charging circuit upon a start of charging in each interval. Upon a start of discharge, the voltage Vc decreases according to an exponential curve that is determined by the time constant of the discharge circuit. In the basic measurement cycle shown in FIG. 4, the detection capacitor C1 is charged and discharged repeatedly and the voltage Vc across the detection capacitor C1 varies in the manner shown in FIG. 4.

In the V0 measuring intervals A1 and A3, a voltage (maximum value) occurring when charging of the detection capacitor C1 has completed is measured as V0. In the VC1$n$ measuring period A2, a voltage occurring when charging of the detection capacitor C1 has completed and its discharge has not started yet is measured as VC1$n$. In the VC1$p$ measuring period A4, a voltage occurring when charging of the detection capacitor C1 has completed and its discharge has not started yet is measured as VC1$p$.

In actuality, the basic measurement cycle shown in FIG. 4 can proceed as the microcomputer 11 shown in FIG. 1 on/off-controls the switching elements S1-S5 for each operation mode or each measurement target. Ground fault resistances RLp and RLn can be calculated on the basis of measured voltages V0, Vc1$n$, and Vc1$p$ that are obtained as a result of execution of the basic measurement cycle.

As for the operation of the ground fault measuring circuit 10, the following Equation (1) holds basically:

$$(RLp+RLn)/(RLp \times RLn) = (Vc1p+Vc1n)/V0 \quad (1)$$

where

V0: charging voltage of the detection capacitor C1 that reflects the output voltage of the vehicular DC high-voltage power source 50;

Vc1$n$: charging voltage of the detection capacitor C1 that is influenced by the negative-side ground fault resistance RLn;

Vc1$p$: charging voltage of the detection capacitor C1 that is influenced by the positive-side ground fault resistance RLp; and RLp, RLn: ground fault resistance.

Thus, the microcomputer 11 can calculate ground fault resistances RLp and RLn according to Equation (1) by recognizing charging voltages V0, Vc1$n$, and Vc1$p$ from signal levels that are input to the microcomputer 11 at the analog input port AD1 in the respective intervals.

Figure 5A:
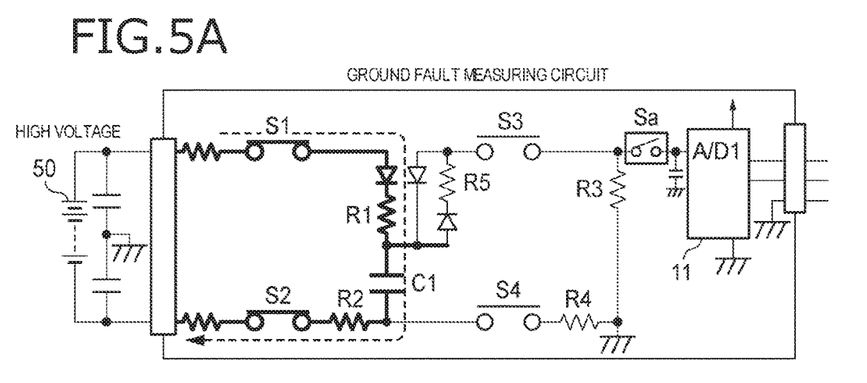
FIGS. 5A, 5B, and 5C are circuit diagrams showing three kinds of states of the ground fault measuring circuit shown in FIG. 1.
Figure 5B:
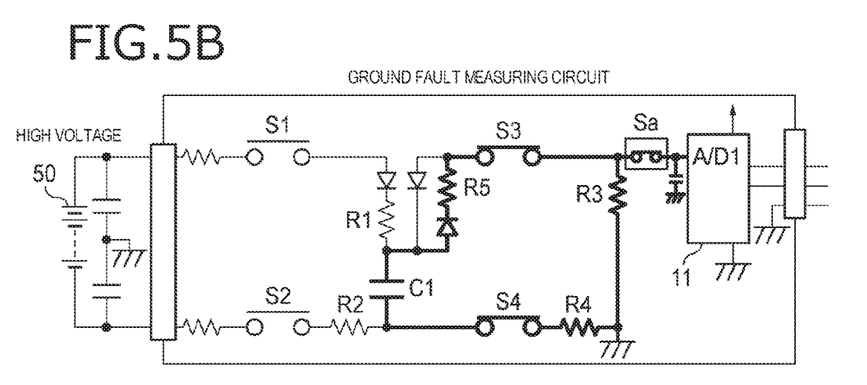
Figure 5C:
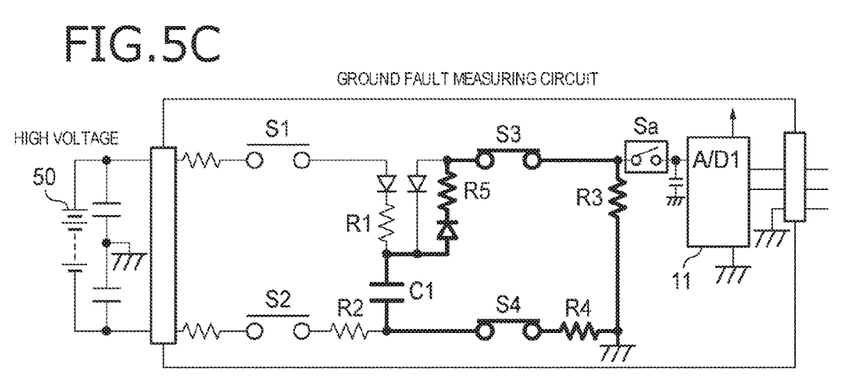

Next, current paths will be described. FIGS. 5A, 5B, and 5C show three kinds of states of the ground fault measuring circuit 10 shown in FIG. 1. FIG. 5A shows a state corresponding to a case that the measurement target is a voltage V0 in the operation mode M01 shown in FIG. 2. FIG. 5B shows a state corresponding to the operation mode M02 shown in FIG. 2, and FIG. 5C shows a state corresponding to the operation mode M04 shown in FIG. 2.

To charge the detection capacitor C1 in order to measure a voltage V0, the switching elements S1 and S2 are closed and the switching elements S3 and S4 are opened, as a result of which a current flows along a path indicated by a thick line in FIG. 5A. The detection capacitor C1 is charged until the voltage across it becomes equal to the output voltage of the vehicular DC high-voltage power source 50. That is, the voltage V0 means the output voltage of the vehicular DC high-voltage power source 50.

When a transition is made to the operation mode M02 after the charging of the detection capacitor C1, the switching elements S1 and S2 are opened, the switching elements S3 and S4 are closed, and the switching element Sa is closed temporarily, as a result of which currents flow along paths indicated by thick lines in FIG. 5B. That is, a voltage between the terminals of the charged detection capacitor C1 can be measured by the microcomputer 11 via the analog input port AD1.

When a transition is made to the operation mode M04 after the completion of the measurement, the switching elements S1 and S2 are kept open, the switching elements S3 and S4 are kept closed, and the switching element Sa is opened, as a result of which a current flows along a path indicated by a thick line in FIG. 5C. That is, the detection capacitor C1 can be discharged until no charge is stored therein.

To make a voltage Vc1$n$ a measurement target in the operation mode M01 shown in FIG. 2, the switching elements S1 and S4 are closed and the switching elements S2 and S3 are opened, as a result of which the detection capacitor C1 is charged by the voltage of the vehicular DC high-voltage power source 50 along a path (not shown) including the negative-side ground fault resistor RLn. In this case, the charging voltage Vc1$n$ of the detection capacitor C1 is influenced by the negative-side ground fault resistance RLn.

To make a voltage Vc1$p$ a measurement target in the operation mode M01 shown in FIG. 2, the switching elements S1 and S4 are opened and the switching elements S2 and S3 are closed, as a result of which the detection capacitor C1 is charged by the voltage of the vehicular DC high-voltage power source 50 along a path (not shown) including the positive-side ground fault resistor RLp. In this case, the charging voltage Vc1$p$ of the detection capacitor C1 is influenced by the positive-side ground fault resistance RLp.

In the operation mode M03 shown in FIG. 2, the switching elements S1, S2, and S3 are opened and the switching elements S4 and S5 are closed, as a result of which the charge stored in the detection capacitor C1 is moved to the EH power unit 30 along a path including the switching elements S4 and S5 and hence the corresponding energy can be collected. At this time, wasteful discharge of the detection capacitor C1 can be prevented by opening the switching element S3.

Figure 6:
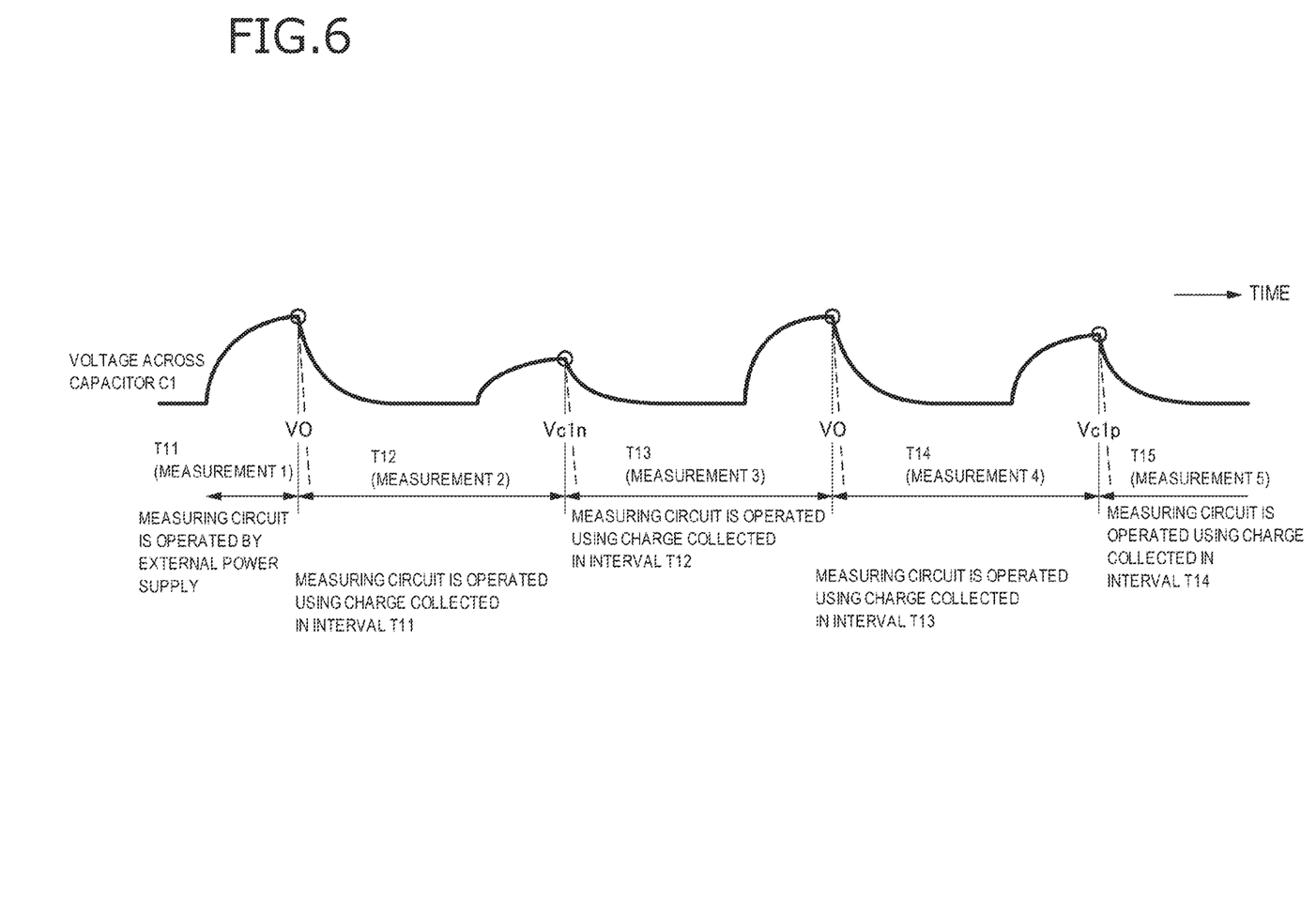
FIG. 6 is a time chart showing an example of how the basic measurement cycle proceeds in a case that the ground fault measuring circuit shown in FIG. 1 operates using collected charge.

Next, an example use of collected energy will be described. FIG. 6 shows an example of how the basic measurement cycle proceeds in a case that the ground fault measuring circuit 10 shown in FIG. 1 operates using collected charge.

The example operation shown in FIG. 6 assumes that power-source power that is supplied from outside is used only in a first, measurement-1 interval T11 in which a voltage V0 is a measurement target and in the subsequent intervals the microcomputer 11 of the ground fault measuring circuit 10 operates on collected energy.

More specifically, in a second, measurement-2 interval T12 in which a voltage Vc1$n$ is a measurement target, the ground fault measuring circuit 10 operates being supplied, from the EH power unit 30, with energy that was collected from the detection capacitor C1 in the preceding measurement-1 interval T11. In a third, measurement-3 interval T13 in which a voltage V0 is a measurement target, the ground fault measuring circuit 10 operates being supplied, from the EH power unit 30, with energy that was collected from the detection capacitor C1 in the preceding measurement-2 interval T12. Likewise, in a fourth, measurement-4 interval T14 in which a voltage V1$cp$ is a measurement target, the ground fault measuring circuit 10 operates being supplied, from the EH power unit 30, with energy that was collected from the detection capacitor C1 in the preceding measurement-3 interval T13. In the following intervals, the ground fault measuring circuit 10 operates in similar manners.

In actuality, the operation shown in FIG. 6 is realized because the EH power unit 30 generates the logic DC power source voltage Vcc using energy that it collects from the detection capacitor C1 of the ground fault measuring circuit 10 and supplies resulting power to the microcomputer 11 of the ground fault measuring circuit 10 and other circuits if the power that the EH power unit 30 receives from an external power circuit at the power input terminal 33 is set at a minimum level.

Example uses of power that the EH power unit 30 outputs in the form of the logic DC power source voltage Vcc, other than the above-described use by the ground fault measuring circuit 10, include the following:

(1) Power for a current sensor.
(2) Power for various electronic control units (ECUs) installed in a vehicle.
(3) Power for driving relays, various electric devices, various loads, etc.
(4) Power for transmission and reception of, for example, a radio signal by a wireless device. For example, when the user of a vehicle manipulates a smart key, the vehicle would be in an ignition-off state. At this time, necessary power can be secured easily using the EH power unit 30.

As in the system shown in FIG. 1, by connecting the EH power unit 30 to a measuring circuit (10) having a detection capacitor (C1) which is a flying capacitor, part, not necessary after completion of a measurement, of power once stored in the detection capacitor (C1) can be collected and reused effectively. Thus, useless consumption of electric energy stored in the detection capacitor (C1) can be suppressed without the need for reducing its capacitance or lowering the measurement frequency.

Since the diode D21 which is provided at the input of the EH power unit 30 prevents an opposite current flow, it is not necessary to suspend a charge collecting operation immediately even when the voltage between the terminals of the detection capacitor C1 has lowered to a large extent. Thus, the EH power unit 30 can collect as much energy as possible from the detection capacitor C1.

<Start/End Timing of Charge Collecting Operation>

As in the operation sequence shown in FIG. 3, the operation mode M03 (step S14) in which the EH power unit 30 collects charge from the detection capacitor C1 in a period from completion of the operation mode M02 to a start of the operation mode M04. The operation mode M03 may be started immediately after completion of the operation mode M02.

As for the timing of finishing the operation mode M03, the collectable energy can be increased by finishing the operation mode M03 when the voltage between the terminals of the detection capacitor C1 has decreased to such a level that no charge can be collected any more.

In actuality, since the discharge time constant of the detection capacitor C1 at the time of charge collection is known, the microcomputer 11 can predict a variation of the voltage between the terminals of the detection capacitor C1 on the basis of the discharge time constant. Charge collection is finished and a transition is made from the operation mode M03 to the operation mode M04 with such timing that a prescribed time determined in advance has elapsed from a start of charge collection, that is, the voltage between the terminals of the detection capacitor C1 has lowered to a prescribed value.

Although in the above embodiment the invention is applied to the ground fault measuring circuit 10, the invention can also be applied to other kinds of measuring circuits. For example, if a circuit having the same configuration as the ground fault measuring circuit 10 shown in FIG. 1 and the measurement target is restricted to a voltage V0, this circuit can be used as a device for measuring a voltage. That is, the invention can also be applied, in the same manner as in the above embodiment, to a voltage measuring device that measures a voltage using four switches and a capacitor. In this case, the measurement target is not limited to a power source voltage of the vehicular DC high-voltage power source 50 but can be any of various voltages on a vehicle.

Where the regulator 32 is to receive AC power, the charge of the detection capacitor C1 may be supplied to the regulator 32 in AC form by opening and closing the switching elements S4 and S5 repeatedly in the operation mode M03.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

What is claimed is:

1. A charge collection device comprising:
   a first capacitor;
   a first switch disposed between one terminal of the first capacitor and a positive electrode of a DC power source;
   a second switch disposed between another terminal of the first capacitor and a negative electrode of the DC power source;
   a third switch disposed between the one terminal of the first capacitor and ground;
   a fourth switch disposed between the other terminal of the first capacitor and the ground; and
   a charge collection circuit that has a fifth switch connected to the one terminal of the first capacitor and configured to supply charge stored in the first capacitor to an external circuit via the fifth switch.

2. The charge collection device according to claim 1, further comprising:
   a measuring circuit disposed between the third switch and the ground and that measures a voltage between the one terminal and the other terminal of the first capacitor.

3. The charge collection device according to claim 1, further comprising:
   a diode and a second capacitor,
   wherein the diode comprises an anode terminal and a cathode terminal, and
   wherein the anode terminal of the diode is coupled with the one terminal of the first capacitor, and the cathode terminal of the diode is coupled with one terminal of the second capacitor.

4. A power collection method of a charge collection device, wherein the charge collection device comprises:
   a capacitor;
   a first switch disposed between one terminal of the capacitor and a positive electrode of a DC power source;
   a second switch disposed between another terminal of the capacitor and a negative electrode of the DC power source;
   a third switch disposed between the one terminal of the capacitor and a ground;
   a fourth switch disposed between the other terminal of the capacitor and the ground;
   a charge collection circuit that has a fifth switch connected to the one terminal of the capacitor and configured to supply charge stored in the capacitor to an external circuit via the fifth switch; and
   a measuring circuit disposed between the third switch and the ground and that measures a voltage between the one terminal and the other terminal of the capacitor,
   the power collection method comprising:
      charging the capacitor by closing the first switch and the second switch and opening the third switch, the fourth switch, and the fifth switch;
      measuring a voltage between the one terminal and the other terminal of the capacitor using the measuring circuit by opening the first switch and the second switch and then closing the third switch and the fourth switch; and
      supplying charge of the capacitor to the external circuit by opening the third switch and then closing the fifth switch.

5. The charge collection device according to claim 1, wherein the first capacitor, the first switch, the second switch, the third switch and the fourth switch constitute a part of a ground fault measuring circuit configured to detect ground fault resistance on an output of the DC power source in a vehicle;
   wherein the charge collection circuit is connected to the ground fault measuring circuit via the fifth switch and is configured to generate DC power source voltage for operating the ground fault measuring circuit; and
   wherein the charge collection circuit has an input terminal which receives power supplied from a vehicle-side power circuit.

6. The power collection method according to claim 4, wherein the capacitor, the first switch, the second switch, the third switch and the fourth switch constitute a part of a ground fault measuring circuit configured to detect ground fault resistance on an output of the DC power source in a vehicle;
   wherein the charge collection circuit is connected to the ground fault measuring circuit via the fifth switch and is configured to generate DC power source voltage for operating the ground fault measuring circuit; and
   wherein the charge collection circuit has an input terminal which receives power supplied from a vehicle-side power circuit.

* * * * *